Nov. 26, 1940. V. V. MALCOM 2,222,970
JOINT STRUCTURE
Filed March 8, 1935  3 Sheets-Sheet 2
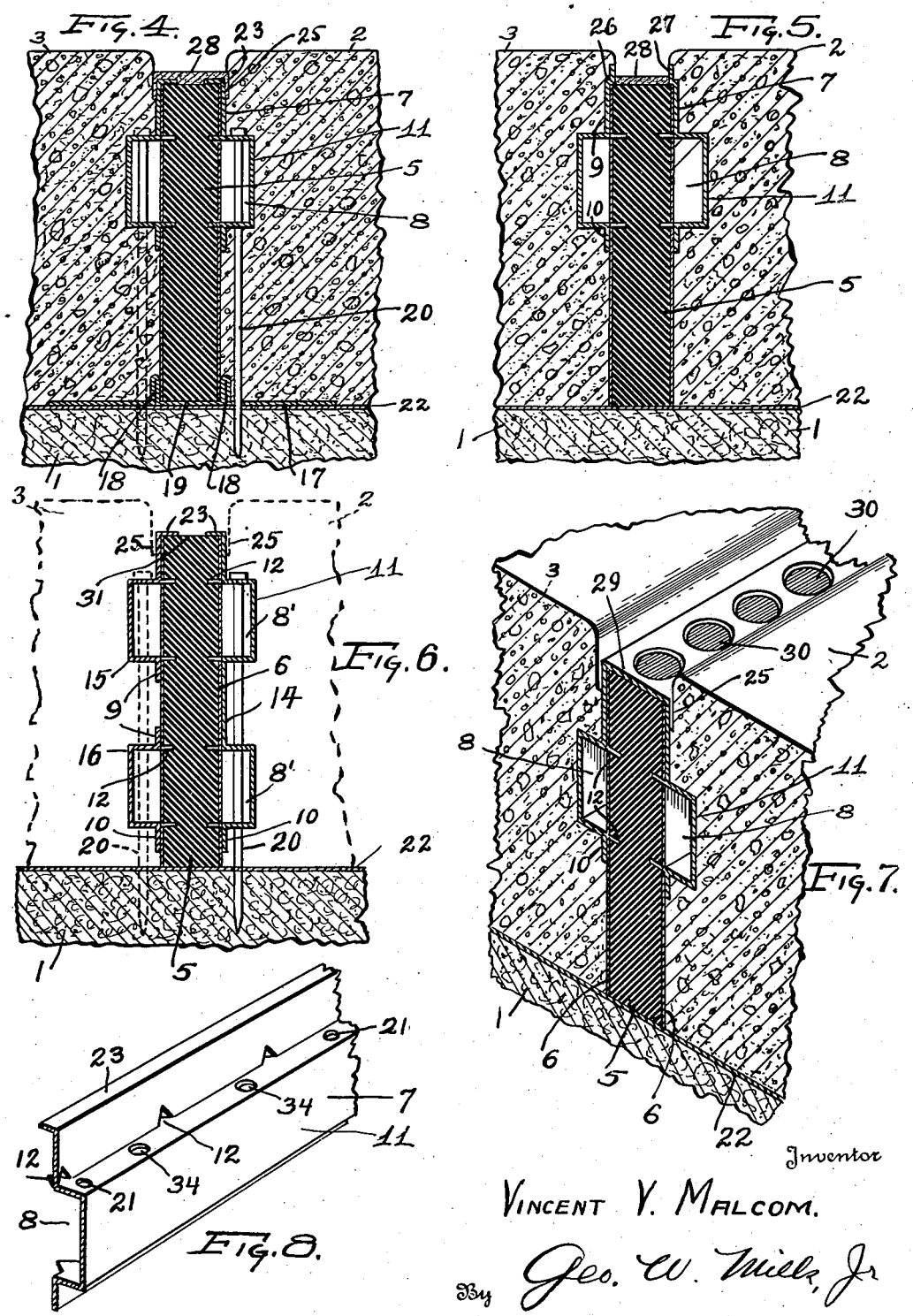

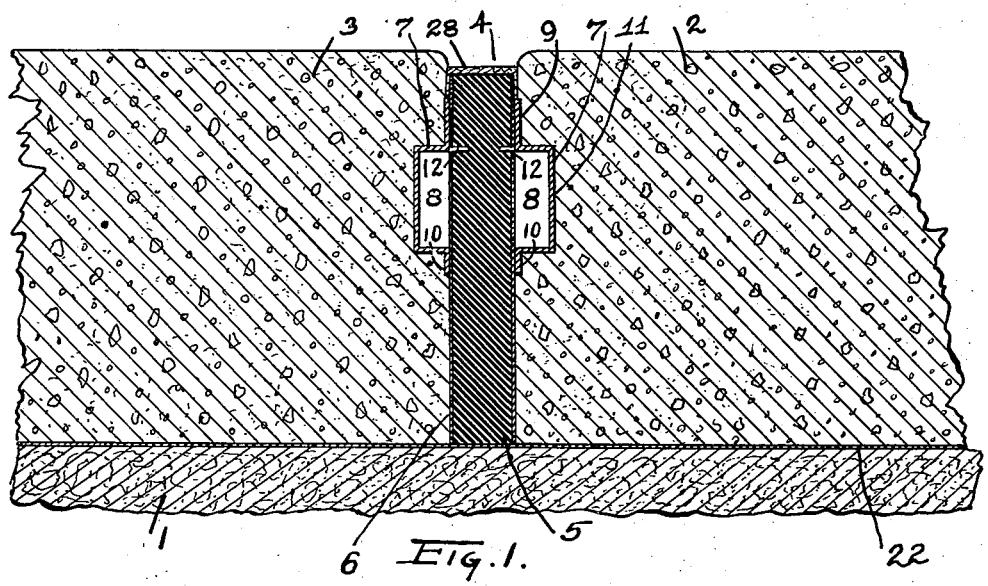
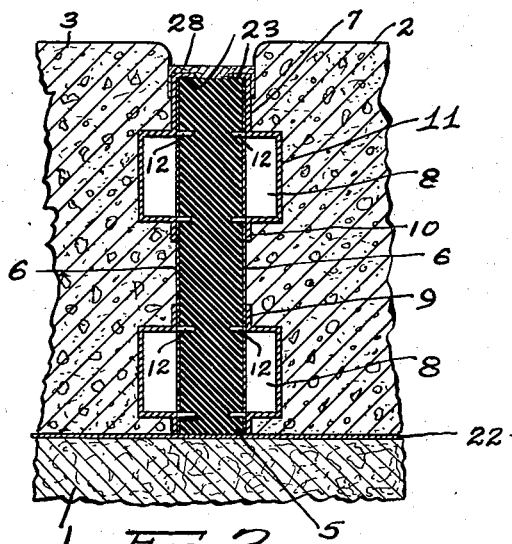
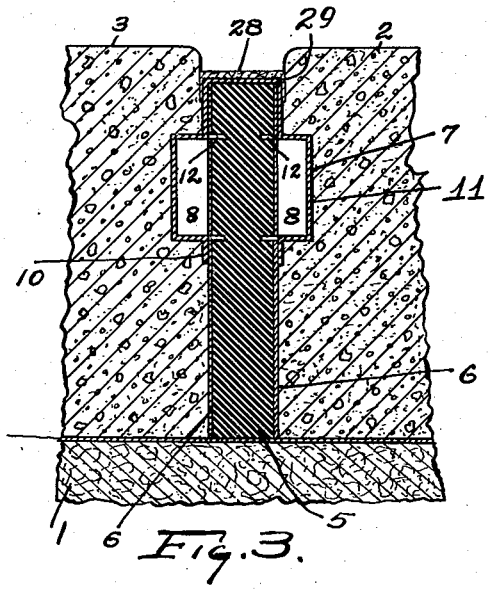

Nov. 26, 1940.  V. V. MALCOM  2,222,970
JOINT STRUCTURE
Filed March 8, 1935  3 Sheets-Sheet 3
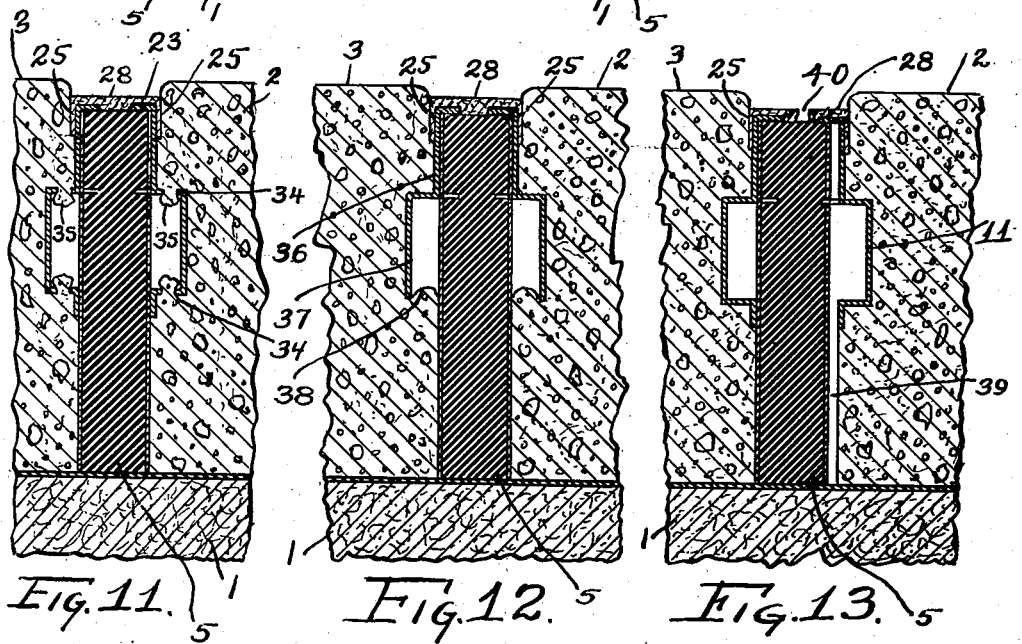
Inventor
VINCENT V. MALCOM.
By Geo. W. Mills, Jr.
Attorney Patented Nov. 26, 1940

2,222,970

UNITED STATES PATENT OFFICE 2,222,970

JOINT STRUCTURE

Vincent V. Malcom, Mariemont, Ohio, assignor to The Philip Carey Manufacturing Company, a corporation of Ohio Application March 8, 1935, Serial No. 10,018

40 Claims. (Cl. 94—18)

This invention relates to building structures and particularly to such structures which comprise spaced apart rigid sections having a joint or filler strip inserted therebetween to provide for contraction and expansion of said sections and also to seal the joint space against infiltration of earth, incompressible materials, and other foreign substances into the joint space.

Many devices have heretofore been employed for spacing paving sections and these have varied widely in construction as well as in the kind of materials from which they were constructed. They have ranged from such non-rigid materials as rubber, cork and ductile bituminous compositions, such as asphalt, to such rigid material as metal forms which have been constructed in the attempt to provide some of the characteristics inherently possessed by the non-rigid materials. Ductile bituminous compositions have been generally accepted as nearest approaching the perfect joint filling material except as to sealing continuously the joint space under movement caused by change in thermal conditions of the paving sections. Accordingly other materials, such as rubber, have been suggested because of their more resilient character, it being believed that the highly resilient character of the materials would permit them to be compressed without extrusion when the paving sections were under compression and would thereby, when compression was released, return to their original shape.

Some of these materials recover slowly and imperfectly but, even if they functioned perfectly, the fact that they do no more than recover would prevent them from making a sealed joint when the paving sections have contracted to lesser dimensions than when installed and therefore do not prevent the infiltration of earth and other foreign material. Bituminous compositions are highly efficient in withstanding weather conditions and have greater weather resisting properties than any other materials used for joint constructions. The present invention aims to provide a joint structure in which provision is made for the compression of the expansion joint without extrusion above the tread surface of the paving blocks and also to at all times effect a seal within the joint space between the joint strip and the paving section. While other compositions may be also adapted for suitable expansion joint strips, the present invention is typified by an expansion joint strip which is of the character of ductile bituminous material, such as asphalt, tar, pitch, and the like with or without fibrous or other materials, which permanently deforms under compression and is adapted to flow to fill a reservoir or reservoirs provided adjacent the expansion joint strip. This reservoir (or reservoirs) is of predetermined capacity in relation to the thickness of the expansion joint strip in order that it may ultimately be filled as also will be the space along the top edge of said joint so as to be ultimately substantially flush with the tread surface of the pavement.

For a better understanding of the invention reference may be made to the accompanying drawings, in which:

Figure 1 is a cross-sectional view through a section of pavement provided with a joint embodying the invention;

Figures 2, 3, 4, 5 and 6 are cross sections of paving sections showing other embodiments of the invention;

Figure 7 is a perspective view of a paving section showing another embodiment of the invention;

Figure 8 is a perspective view of the plate shown in Figure 4 applied to the side or sides of the joint strip;

Figure 9 is a cross-sectional view showing a paving section after the joint strip has been partially compressed;

Figure 10 is a cross-sectional view showing a paving section after the joint strip has been compressed to fill the reservoirs provided adjacent to said strip;

Figures 11 and 12 are cross-sectional views of paving sections showing embodiments of the invention; and Figure 13 is a cross-sectional view of a paving section embodying one modification of the invention and showing a condition where contraction of the paving sections precedes expansion.

Referring specifically to the drawings in which like numerals are used to designate like parts, numeral 1 designates a foundation or subgrade of any suitable material graded to receive a surfacing layer of concrete or other suitable material superposed thereon, said surfacing structure preferably being composed of paving sections 2 and 3 which at desired spaced intervals are separated by an expansion joint structure designated herein generally by numeral 4. The expansion joint structure is typified by a composition strip 5 which is of the character of ductile bituminous material, such as asphalt, tar, pitch and the like either with or without fibrous materials. Inasmuch as this material is preferably soft for efficient operation when placed within the joint it is preferably manufactured with reinforced sides 6 such as paper felt or the like which is also preferably waterproofed by some suitable saturant. It will, of course, be understood, however, that the invention is not limited to an expansion joint strip which is faced with reinforced strip, for a suitable strip may be provided which is internally reinforced by fibrous or other filling ingredients or the strip may also be reinforced by foundation sheet or sheets like sheets 6 embedded within the mass. One or both sides of the strip 5 may have associated therewith a plate 7, of any suitable material having the desired rigidity, stamped or otherwise formed with a recess or reservoir 8 adjacent joint strip engaging faces 9 and 10. This plate may be composed of any suitable material having sufficient strength to act as a form for molding the concrete. It is typified herein by a metal strip of copper, steel or the like.

The various embodiments illustrate plates of similar constructions applied to both sides of the joint strip, but it will be understood that they may be applied to only one side of the strip if desired. This recess or reservoir may be of any shape or contour but it is believed preferable to have the adjoining portion between the reservoir and the joint strip engaging portions such that the angles adjacent the embossment on the outside of the strip are 90 degrees or less. This always provides continuous contact between concrete over the reservoir and the extruded asphalt in the reservoir during contraction of the paving sections, thereby at all times effecting protection against infiltration of foreign matter. The portion which is stamped to provide the reservoir on one side of the strip also provides an embossment 11 on the opposite face for interengaging with the adjacent end of the paving section. It is also preferable to have the plate provided with means for attaching same to the joint strip, thereby permitting the strip to be readily assembled at the time of installation or the plate and joint strip may be assembled as a unit at the place of manufacture. To effect this, the strip may be provided with a suitable impinging means, typified herein by tongues 12 which may be stamped from the plate. These tongues may be provided on any part of the plate which engage with the strip but are preferably formed at the juncture of the reservoir portion and the strip contacting portions in order that they may also function to cut and weaken the felt or other reinforcement if same be used on the joint strip. Thus the felt is caused to separate and break at predetermined places 13 during the compression of the joint strip between the paving sections without impairing or resisting deformation of the joint strip.

While the reservoir plates may be employed only on one side of the strip, it is believed preferable to have them provided on both sides. Also one or more plates may be applied on the same side of the strip, these being in the form of a single plate with a plurality of reservoirs, or separate plates may be used, each of which provides one reservoir. Numeral 14, Figure 6, designates a single plate formed with a plurality of continuous channels or reservoirs 8' on one side of the joint strip. The other side of the joint strip is provided with two separate strips 15 and 16 each of which is of substantially the same construction and together are of the same construction as plate 14 except that they are separate rather than integral. The channels or reservoirs are not necessarily continuous but might be in the form of several individual reservoirs. In order to conveniently install the joint strip and plates within the pavement the strip may be conveniently supported on a holder or base plate 17 which is formed from a strip of flexible metal having portions crimped therefrom to provide flanges 18 with an intervening space 19 which will be of substantially the same width as the expansion joint strip. The expansion joint strip is mounted upon the base plate with the bottom edge fitted within the recess and the strip and plates are secured to the foundation by any suitable staking means 20 which are projected through perforations 21 provided in the plates, the base plate and into the subgrade. In some types of structures, such as pavements for example, it is desirable to have a waterproofing protective layer interposed between the subgrade and the surfacing paving sections and this is typified in the present instance by sheets of saturated felt laid over the subgrade to provide a continuous waterproofing layer 22.

I have shown various modifications of plates suitable to be applied to the side or sides of the joint strip to provide recesses or reservoirs. These may, if desired, be advantageously provided with an overturned flange 23 which is adapted to fit partially over the top edge of the joint strip. After the expansion joint has been installed, the concrete is poured, smoothed and edged adjacent to the joint with a finishing or edging tool that cuts away the concrete superposed upon and overlying the joint strip and rounds off the corners of the adjacent paving sections. A conventional edging tool is provided with a trowel surface having a lip on one edge so that the trowel surface may be guided by the lip engaging the side face of the joint strip or the plate attached thereto. Subsequently to this finishing and the removal of the concrete overlying the joint strip, there may be left a space slightly greater than the width of the joint strip with shallow grooves 25 on each of the top edges of the joint strip and bituminous material may be poured within the space to provide a sealing layer or cap 28 over the joint strip and filling the grooves 25.

In Figure 5 a modification is shown in which the strip or the upper edge of the plate also overlies the top edge of the strip at 26 and is further provided with an upwardly disposed extension 27. Accordingly when the joint is edged the lip of the edging tool will engage with the inside faces of the extensions. In this modification the resulting space is the same or less than the width of the joint strip and accordingly the joint strip itself serves as a sealing means but it will, of course, be understood that a bituminous or other suitable composition 28 may be poured thereon to either partially or completely fill the joint space flush with the tread surface of the pavement, if desired, as in the case of the other embodiments illustrated and described.

In Figure 3 the plates are combined into an integral structure to form a cap 29 which fits over the top edge of the joint strip. This structure in addition to providing the reservoir plates also serves to cap the exposed edge of the joint strip. The top edge or cap portion may be preferably imperforate or provided with any number of recesses 30 (Fig. 7) and these may be of any desired size and shape. They permit extrusion of the expansion joint strip and function in substantially the same manner as does the space 31 which is between the overlapping ends of the plates in Figure 6, and others but it is believed that they will more positively retard extrusion until after the reservoirs in the side plate or plates have been completely filled.

In Figure 9 a section of paving is illustrated in which the expansion joint strip has been partially compressed to about twenty-five (25) per centum of the original thickness. It will be seen from this that the reservoirs in the plates permit the material to be squeezed therein and the projections stamped from the plates cause the felt to break at predetermined places 13. While I have shown for purpose of illustration the impinging prongs on each side of the reservoir, it will be understood that they may be formed only on one side. In fact, in some instances, it is believed preferable to have the breaks in the reinforcing sides to occur only at the upper point of the reservoir as this permits the bituminous core to enter the reservoir and first begin to fill at this point, thereby effecting a sealed joint sooner than would happen without the felt being broken or weakened. A slight extrusion takes place vertically and shows the space above the edge of the joint to be partially filled. As the strip extrudes and flows upwardly it removes any dirt and other foreign material which may have become settled in the space.

In Figure 10 there is disclosed a paving section in which the joint strip has been substantially compressed, or compressed sufficiently to fill the reservoirs which is about fifty (50) per centum of its original thickness. Any subsequent compression forces the material upwardly which under the movement of traffic vehicles causes the space between the paving sections above the joint to be substantially filled. The amount of compression the first year will vary, depending upon the time of year when the joint was installed. If installed after the winter months or during the summer months, compression of the joint will result almost immediately and no temporary seal is necessary. However, installation conditions or temperatures might conceivably create circumstances causing contraction before a seal has been perfected by extrusion of the joint. In this case a temporary seal is desirable until weather conditions are such to cause extrusion of the joint into the reservoir, thereby effecting a permanent seal. This temporary seal is effected by overlapping a portion of the plate over the top edge of the joint material as illustrated by the overturned flanges 23 above described. The result is also accomplished by a cap which is used separately or as an integral with the plate or plates as above described and illustrated in Figures 3 and 7. During subsequent compression, it is possible that because relatively light material is used the overturned flanges 23 may be forced upwardly as a result of extrusion and may possibly be ultimately flattened out against the edges of the respective paving sections. If this should occur, it would take place during extrusion, and they will have in the meantime served their function as a temporary seal.

The plates may be assembled with the joint strip and shipped as a unit, or they may be handled separately and then applied at the time the joint structure is formed in the pavement. These plates, as above described, may be recessed at spaced intervals to receive stakes 20 provided with a pointed end for being driven into the subgrade 1. Stakes may be used for installing the joint structure whether one plate (Fig. 4) or two plates (Fig. 6) be used on each side.

In addition to the recesses formed in the channel portion of the strip there also may be recesses 34 in order that the said strip may be positively interlocked with the concrete material, for when the concrete material is poured (Fig. 11) a portion of it will project through the recesses in the strip to form anchoring portions or buttons 35.

Referring to that embodiment in Figure 12, strip 36 may be provided with an embossment 37 having one side open at 38; otherwise the strip is of the same general structure as above described. The open edge of the strip functions in much the same manner as the recesses 34 in that modification shown in Figure 11, in that they permit the concrete material of adjacent slabs to flow partially within and form an interlocking connection with the strip.

Reference has above been made to the fact that under certain conditions contraction of the pavement might take place before expansion and before there has been any compression or extrusion of the joint strip. If this takes place the strip moves with one of the concrete sections as illustrated in Figure 13, thereby spacing at 39 the strip from the other concrete section. During this time the overlapping flange and/or the embossment on the plate provide a temporary seal against the infiltration of earth and other foreign material. The poured asphalt sealing means might in some instances be brittle and probably would break away 40 and be spaced in two parts but the flange on the strip overhangs the top edge of the joint trip and the embossment interengages with the adjacent concrete section and effect a temporary seal until expansion of the pavement takes place and the joint strip begins to be compressed and extruded.

While I have shown various modifications illustrating definite details of construction, it will be understood that the invention is not limited to the specific embodiments shown or the details of their construction but there may be various changes without departing from the spirit of the invention.

I claim:

1. A pavement comprising a paving section having associated therewith a joint strip and an elongated plate provided with means for engaging with said section and a normally empty reservoir provided in the plate adjacent to and bridged over by said joint strip and having a portion providing continuing contact between portions of the joint strip and plate after compression of the joint strip.

2. A pavement comprising spaced apart paving sections having a joint strip interposed therebetween which is of a character to be permanently deformed and displaced under compression of the paving sections, and means adjacent the joint strip providing a normally empty reservoir to receive under compression by said paving section the displaced portion of the joint strip and having a portion disposed at a ninety degree angle or less with the face of the joint strip to effect continuing contact between portions of said joint strip and plate.

3. A pavement comprising a paving section provided with an expansion joint, a filler material in said expansion joint, and means located between the expansion joint and the adjacent paving section providing a contacting portion and forming between said means and the filler material a space within a portion of the paving section into which filler material may flow and be in continuing contact with the contacting portion of said means after expansion of the paving.

4. A pavement comprising spaced apart paving sections having a joint strip interposed therebetween which is of a character to be permanently deformed and displaced under compression of the paving sections, means adjacent the joint strip providing a contacting portion and a reservoir to receive the displaced portion of joint strip and effect continuing contact with the contacting portion of said means, and means for sealing the exposed edge of the strip.

5. An expansion joint strip adapted for insertion between spaced apart paving sections comprising a strip of waterproofed material which is of a character to be deformed and displaced when subjected to compression by the paving sections, and means adjacent the strip spacing a portion of an adjacent paving section and providing a contacting portion and a normally empty reservoir to receive the displaced portion of the strip and effect continuing contact with the contacting portion of said means.

6. In a construction comprising independent adjacent sections having the character of contracting and expanding with thermal changes, a space between the adjacent sections to permit such expansion and contraction, a groove or channel arranged in one of the faces of a section parallel to the face of the next adjacent section and between the upper surface and the lower surface of the section, filler material adapted to normally fill the space between said sections but not the said groove or channel, said filler material being of a plastic character and adapted upon compression to be forced into the said groove or channel and to assume a permanent form as a result of being forced into said channel under further pressure and to eventually fill the said channel and provide continuing contact between portions of adjacent elements.

7. In an expansion joint filler material for use in a joint space, a material adapted to be deformed under pressure, a contacting portion adjacent the space and means adjacent one surface of the material adapted to compress the said material without compressing an intermediate portion thereof so as to cause the intermediate portion to be deformed into a body of greater width than its normal width and provide continuing contact with the contacting portion across the joint space.

8. In an expansion joint filler material and a section having a recess therein, a permanently deformable body, a reinforcement for said body, said reinforcement being capable of readily breaking under pressure so as to permit the deformable material to flow into the recess and form a mass greater in width than the normal width of the filler material.

9. An expansion joint strip adapted for insertion between spaced apart paving sections comprising a strip of waterproofing material which is of a character to be permanently deformed and caused to be displaced when subjected to compression by the paving sections, means adjacent the strip provided with a contacting portion and a normally empty reservoir to receive the displaced portion of the strip and provide continuing contact with the contacting portion thereof, and means for staking the strip in place.

10. A permanent seal between paving sections comprising a strip of waterproofing material therebetween which is of a character to be permanently deformed and caused to be displaced when subjected to compression by the paving sections, and a normally empty reservoir and contacting portions adjacent the strip to receive the displaced portion thereof after compression by said paving sections and provide continuing contact between the sections and the contacting portions.

11. A permanent seal between members in an expansion joint space, which changes in size in proportion to the change in size of adjacent members, at an angle to the joint space, caused by thermal conditions, comprising a permanent filler, a normally empty reservoir and a contacting portion provided intermediately of the opposite sides of said members, and a waterproof deformable material in the filler space between adjacent members to normally fill said space but not the reservoir, said deformable material adapted under the expansion of said members to flow into the reservoir and provide continuing contact with the contacting portions.

12. An expansion joint strip adapted for insertion between spaced apart paving sections comprising a strip of waterproofing material which is of a character to be permanently deformed and caused to be displaced when subjected to compression by the paving sections, and a metal plate adjacent the strip provided with a normally empty reservoir to receive the displaced portion of the strip and effect continuing contacting relation with a contacting portion adjacent said reservoir and also provided with a projection for engaging with an adjacent paving section.

13. An expansion joint comprising a deformable body, a reinforcement for said body, said reinforcement being capable of being readily broken under pressure, a contiguous cavity, said reinforcement bridging over said cavity to prevent the deformable material from entering the cavity, all so arranged that when pressure is exerted by expansion of the construction adjacent the expansion joint the deformable material breaks the reinforcement and flows into the cavity providing continuing contacting relation between portions of said cavity and plate.

14. A pavement comprising spaced apart sections having a joint strip interposed therebetween comprising a deformable material having on its face a non-metal material readily yieldable under pressure, a reservoir in the face of the pavement, adjacent the joint filler, arranged intermediate the top surface of the pavement and the bottom of the pavement, said reservoir being normally bridged by the non-metal material and adapted upon compression of the deformable material by expansion of the pavement to receive a portion of the deformable material after yielding of the non-metal material and provide continuing contacting relation between portions of the strip and pavement sections.

15. A paving structure comprising spaced apart sections to provide a joint space, a recess formed in one of the sections providing a normally empty reservoir and a contacting portion adjacent the joint space, and a strip inserted within the space and adapted to flow into the reservoir and contact with the contacting portion to provide a continuing seal between the sections after the strip is compressed and the sections have contracted.

16. A paving structure comprising spaced apart sections to provide a joint space, recesses in the sections providing normally empty reservoirs and contacting portions on adjacent ends of the sections, and a strip inserted within the space and adapted to flow into the reservoirs and contact with the contacting portions to provide a continuing seal between the sections after the strip is compressed and the sections have contracted.

17. A paving structure comprising spaced apart sections to provide a joint space, normally empty recesses and contacting portions formed on adjacent ends of the sections, and a plastic filling material within the space adapted upon compression to flow into the recesses providing, during contraction or expansion of the sections, a continuing contacting relation between a portion of the filling material and the contacting portions of the adjacent sections, thereby continuingly sealing the joint space against the passage of foreign substances.

18. A paving structure comprising spaced apart sections to provide a joint space, normally empty recesses and contacting portions formed on adjacent ends of the sections, and a yieldable waterproof filling material within the space adapted upon compression to flow into the recesses providing, during contraction or expansion of the sections, a continuing contacting relation between a portion of the filling material and the contacting portions of the adjacent sections, thereby continuingly sealing the joint space against the passage of foreign substances.

19. A pavement comprising spaced apart paving sections to provide a joint space therebetween, a recess provided in an end of one of the sections to provide a reservoir offset from the joint space, and a joint strip of a character to flow under compression interposed between the sections to fill completely the joint space but not the reservoir, thereby leaving said reservoir normally empty to receive that part of the joint strip which is caused to flow out of the joint space under compression and provide an offset portion in continuing contact with a portion of the reservoir wall.

20. A joint forming structure between members comprising a normally empty reservoir formed adjacent one of said members, a plastic joint filler strip, and facings on the sides of the strip bridging over the reservoir but adapted to be separated for the extrusion of the material forming the strip into said reservoir when said strip is compressed.

21. A non-extruding joint filler strip adapted to be embedded in a joint space between spaced apart sections comprising a plastic filler strip and plates on the sides of the strip having the recesses formed facing the strip and adapted to be filled by material displaced from the strip to provide continuing contact between the strip and the sections.

22. In a joint for sealing a space between the adjacent ends of slab sections, the combination of a pair of corrugated side plates respectively engageable with said slab ends and a yieldable filler located between said side plates, said side plates and filler being in engagement with and spaced from each other at intervals of the width of said filler and side plates.

23. In a joint for sealing a space between the adjacent ends of slab sections, the combination of a pair of metallic corrugated plates providing the outer walls of said joint and a yieldable filler located between said plates and crests of the corrugations of one plate being located opposite and facing the crests of the corrugations of the other plate.

24. In a joint for sealing a space between the adjacent ends of slab sections, the combination of a pair of longitudinally corrugated side plates respectively engageable with said ends and a substantially flat narrow yieldable filler located between said side plates.

25. In a joint for sealing a space between the adjacent ends of slab sections, the combination of a pair of longitudinally corrugated side plates for engagement with said ends of said slab sections and a yieldable filler located between said side plates the crests of the corrugations of one plate being located opposite and facing the crests of the other plate.

26. In a joint for sealing a space between the adjacent ends of slab sections, the combination of a pair of corrugated side plates providing outer walls of said joint and a yieldable filler located between said side plates spaced from said side plates at intervals of the width of said plates and having an edge thereof extending beyond the upper edges of said side plates.

27. In a joint for sealing a space between the adjacent ends of slab sections, the combination of a pair of corrugated side plates and a mastic filler located between said side plates, the troughs of said corrugations of one plate being located opposite the troughs of the other plate and projecting in opposite directions from said filler providing pockets for the reception of said filler upon compression of said filler.

28. In a joint for sealing the space between adjacent ends of slab sections the combination of corrugated side plates providing outer walls of said joint and an expansible and contractable member arranged between the corrugated plates, said member having a portion thereof extending beyond the upper edge of said corrugated plates, the troughs of the corrugations of said plates being spaced from said member at intervals of the width of said member and providing pockets for the reception of portions of said member upon compression of the latter.

29. In a joint for sealing the space between adjacent ends of slab sections, the combination of a pair of metallic corrugated plates and a mastic filler located between said plates, the crests of said plates being arranged opposite and projecting toward each other, the troughs of said corrugations of said plates being arranged opposite and projecting in opposite directions from each other, the crests providing means for engaging said filler and forcing said filler into said troughs upon a reduction of the space between said slab sections.

30. In a joint for sealing the space betweeen adjacent ends of slab sections, the combination of a pair of metallic corrugated plates and a mastic strip providing a filler located between said plates, the troughs of said corrugations being spaced from said filler and providing pockets for the reception of said filler upon compression of said filler, the crests of said corrugations providing means forcing said filler into said pockets upon a reduction of said space between said slab sections.

31. A pair of wall sections, a sheet of displaceable waterproof material between said sections, normally unfilled cups placed in the adjacent faces of said sections with their open ends disposed against said sheet and adapted to receive a portion of the sheet therein upon compression of the sheet by expansion of the wall sections.

32. An elongated plate adapted for use in expansion joints to be inserted between a joint strip and a paving section comprising a base portion and an adjacent projecting means on one side both adapted to contact with the paving section, portions on the other side having therebetween an open hollow means which is adapted to be bridged over by the joint strip adapted to seat against said portions to provide a normally empty reservoir between the side of said joint strip and a bottom of the hollow means and a wall portion adjacent the hollow means adapted after compression of the joint strip to provide continuing contacting relation between portions of the joint strip and plate.

33. An elongated plate adapted for use in expansion joints to be inserted between a joint strip and a paving section comprising a base portion and an adjacent offset means on one side both engaging with the paving section and a normally empty and open reservoir on the other side adapted to receive joint strip material during compression thereof, and means adjacent one edge of the plate for projecting over an exposed edge of the joint strip.

34. An elongated molding plate adapted for use in expansion joints to be inserted between a joint strip and a paving section comprising a base portion and an adjacent projecting means on one side both adapted to contact with the paving section, an open hollow means on the other side opposite the projecting means and an adjacent contacting portion, said means and contacting portion adapted to be bridged over by the joint strip to provide a normally empty reservoir between the side of said joint strip and a bottom of the hollow means and provide a continuing contact seal therebetween subsequent to compression of the joint strip.

35. An elongated plate adapted for use in expansion joints to be inserted between a joint strip and a paving section comprising a base portion and an adjacent offset means on one side both engaging with the paving section and a normally empty and open reservoir on the other side adapted to receive joint strip material during compression thereof, and having one edge overturned to seat on the edge of the joint strip for providing a seal therebetween.

36. An elongated molding plate adapted for use in expansion joints to be inserted between a joint strip and a paving section comprising a base portion and an adjacent projecting means on one side both adapted to contact with the paving section, an open hollow means on the other side opposite the projecting means, a face portion adjacent the hollow means to abut a joint strip, and a contacting portion adjacent the hollow means disposed at an angle to the face portion, said hollow means and contacting portion adapted to be bridged over by the joint strip to provide a normally empty reservoir between the side of said joint strip and a bottom of the hollow means and provide a continuing contact seal therebetween subsequent to the compression of the joint strip.

37. An elongated molding plate adapted for use in expansion joints to be inserted between a joint strip and a paving section comprising a base portion and an adjacent projecting means on one side both adapted to contact with the paving section, an open hollow means on the other side opposite the projecting means, a flat portion on each side of the hollow means to abut the joint strip, a contacting portion adjacent the hollow means disposed at a 90° angle or less with the flat portions, and an overturned edge adapted to seat on the edge of the joint strip for providing a seal therebetween preliminary to compression of the joint strip, said hollow means and contacting portion adapted to be bridged over by the joint strip to provide a normally empty reservoir between the side of said joint strip and a bottom of the hollow means and provide a continuing contact seal therebetween subsequent to the compression of the joint strip.

38. An elongated plate adapted for use in expansion joints between an expansion joint strip and a paving section comprising a plurality of vertically spaced apart projection means on one side for engaging with the paving section, and a normally empty and open reservoir on the other side of the plate opposite each projection adapted to receive joint strip material for providing a continuing seal.

39. An elongated plate adapted for use in expansion joints between an expansion joint strip and a paving section comprising a plurality of vertically spaced apart projection means on one side for engaging with the paving section, a normally empty and open reservoir on the other side of the plate opposite each projection adapted to receive joint strip material for providing a continuing seal and means adjacent the top edge of the plate for extending transversely of the joint strip.

40. A sectional device for use in expansion joints comprising two elongated plates adapted to be spaced apart between two paving sections, each of said plates comprising projecting means on one side adapted to contact with a paving section, base portions on the other side having therebetween an open hollow means which is adapted to be bridged over by a joint strip adapted to seat against said portions to provide a normally empty reservoir between the side of said joint strip and a bottom of the hollow means, and a wall portion adjacent the hollow means adapted after compression of the joint strip to provide continuing contacting relation between portions of the joint strip and plate.

VINCENT V. MALCOM.